(12) United States Patent
Son et al.

(10) Patent No.: US 10,198,827 B2
(45) Date of Patent: Feb. 5, 2019

(54) INSPECTION METHOD AND SYSTEM AND A METHOD OF INSPECTING A SEMICONDUCTOR DEVICE USING THE SAME

(71) Applicant: Samsung Electronics Co., Ltd., Suwon-si, Gyeonggi-do (KR)

(72) Inventors: Woongkyu Son, Hwaseong-si (KR); Sangkyo Lim, Yongin-si (KR); Sunhee Shim, Suwon-si (KR); MiJung Jeon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 165 days.

(21) Appl. No.: 15/409,922

(22) Filed: Jan. 19, 2017

(65) Prior Publication Data

US 2017/0256070 A1     Sep. 7, 2017

(30) Foreign Application Priority Data

Mar. 3, 2016 (KR) .................. 10-2016-0025805

(51) Int. Cl.
| | |
|---|---|
| *G06T 7/62* | (2017.01) |
| *G06T 7/00* | (2017.01) |
| *G06T 5/00* | (2006.01) |
| *G06T 5/50* | (2006.01) |

(52) U.S. Cl.
CPC .............. *G06T 7/62* (2017.01); *G06T 5/003* (2013.01); *G06T 5/50* (2013.01); *G06T 7/001* (2013.01); *G06T 2207/10061* (2013.01); *G06T 2207/10148* (2013.01); *G06T 2207/20016* (2013.01); *G06T 2207/20221* (2013.01); *G06T 2207/30148* (2013.01)

(58) Field of Classification Search
CPC .............. G06T 7/62; G06T 5/003; G06T 5/50
USPC ....................................................... 356/625
See application file for complete search history.

(56) References Cited

U.S. PATENT DOCUMENTS

| | | | |
|---|---|---|---|
| 7,384,160 B2 | 6/2008 | Matsumoto et al. | |
| 8,805,050 B2 | 8/2014 | Olson et al. | |
| 8,878,923 B2 | 11/2014 | Henderson et al. | |
| 2007/0092130 A1* | 4/2007 | Shishido ................... | G06T 7/74 382/151 |
| 2014/0204196 A1 | 6/2014 | Loney et al. | |
| 2014/0307052 A1 | 10/2014 | Ahn et al. | |
| 2015/0053855 A1* | 2/2015 | Shirai ..................... | G01B 15/00 250/307 |

FOREIGN PATENT DOCUMENTS

| | | |
|---|---|---|
| JP | 4158750 | 10/2008 |
| JP | 2009079915 | 4/2009 |
| JP | 2011013194 | 1/2011 |
| JP | 5043741 | 10/2012 |
| JP | 2013114893 | 6/2013 |

(Continued)

*Primary Examiner* — Roy M Punnoose
(74) *Attorney, Agent, or Firm* — Onello & Mello, LLP (57) ABSTRACT

A method of inspecting a sample includes performing a focusing operation on a target pattern of a sample. The focusing operation includes scanning the target pattern at different focusing levels to obtain a plurality of focus images. The method further includes using at least one of the plurality of focus images as a target pattern image of the target pattern and then measuring a dimension of the target pattern based on the target pattern image.

20 Claims, 8 Drawing Sheets

(56) References Cited

FOREIGN PATENT DOCUMENTS

| | | |
|---|---|---|
| JP | 2015018721 | 1/2015 |
| KR | 20070077288 | 7/2007 |
| KR | 20110028982 | 3/2011 |
| KR | 101173631 | 8/2012 |
| KR | 101497105 | 3/2015 |

* cited by examiner

INSPECTION METHOD AND SYSTEM AND A METHOD OF INSPECTING A SEMICONDUCTOR DEVICE USING THE SAME

CROSS-REFERENCE TO RELATED APPLICATIONS

This U.S. non-provisional patent application claims priority under 35 U.S.C. § 119 from Korean Patent Application No. 10-2016-0025805, filed on Mar. 3, 2016, in the Korean Intellectual Property Office, the disclosure of which is hereby incorporated by reference in its entirety.

BACKGROUND

The present inventive concepts relate to an inspection method and system and a method of inspecting a semiconductor device using the same.

Due to the small-sized, multifunctional, and/or low-cost characteristics of semiconductor devices, semiconductor devices are important elements in the electronic industry. The semiconductor devices may be fabricated using various processes such as photolithography, etching, deposition, ion implantation, and cleaning processes.

An inspection process is performed to examine whether there are any failures in patterns of a fabricated semiconductor device. By performing the inspection process, it is possible to optimize a process condition of the fabrication process and determine whether there are any failures in a semiconductor device at an early stage.

As the semiconductor device is scaled down, there is an increasing demand for a method and a system capable of reliably measuring dimensions of fine patterns in the semiconductor device.

SUMMARY

Some embodiments of the inventive concepts provide a method and a system that are configured to inspect a sample within a reduced process time.

Some embodiments of the inventive concepts provide a method of cost-effectively inspecting a semiconductor device.

In one aspect, a method of inspecting a sample may include performing a focusing operation on a target pattern of a sample. The focusing operation may include scanning the target pattern at different focusing levels to obtain a plurality of focus images. The method may further include using at least one of the plurality of the focus images as a target pattern image of the target pattern and then measuring a dimension of the target pattern based on the target pattern image.

In another aspect, a system for inspecting a sample may include an image scanning unit configured to obtain an image of a pattern formed on a sample and a controller configured to control the image scanning unit. The controller may be configured to control the image scanning unit to perform a scanning operation on the pattern at different focusing levels and to obtain a plurality of focus images. The system may further include a data processing unit configured to store at least one of the plurality of the focus images as a pattern image of the pattern and to measure a dimension of the pattern based on the pattern image.

In another aspect, a method of inspecting a semiconductor device may include providing a semiconductor substrate with a target pattern, disposing an image scanning unit on the semiconductor substrate, operating a controller connected to the image scanning unit to control the image scanning unit to perform a scanning operation on the target pattern at different focusing levels and to obtain a plurality of focus images, operating a data processing unit connected to the image scanning unit to store at least one of the plurality of the focus images as a target pattern image of the target pattern and to measure a dimension of the target pattern based on the target pattern image, and examining whether the dimension of the target pattern is within an allowable range.

In another aspect, a method of inspecting a sample may include performing a focusing operation on a pattern of a sample. The focusing operation may include scanning the pattern at different focusing levels spaced apart from each other in a first direction to obtain a plurality of focus images. The method may further include using at least one of the plurality of the focus images as a pattern image of the pattern and measuring a dimension of the pattern based on the pattern image.

BRIEF DESCRIPTION OF THE DRAWINGS

These and/or other aspects and advantages of the present general inventive concepts will become apparent and more readily appreciated from the following description of the embodiments, taken in conjunction with the accompanying drawings.

DETAILED DESCRIPTION

Reference will now be made in detail to the embodiments of the present general inventive concepts, examples of which are illustrated in the accompanying drawings, wherein like reference numerals refer to the like elements throughout. The embodiments are described below in order to explain the present general inventive concepts by referring to the figures.

Figure 1:
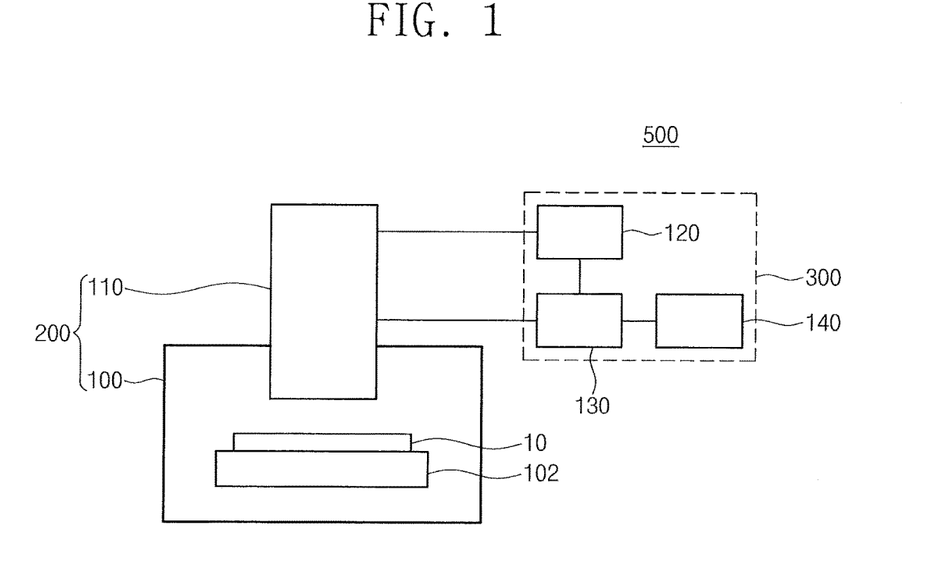
FIG. 1 is a schematic diagram illustrating a sample inspection system according to some embodiments of the inventive concepts.

FIG. 1 is a schematic diagram illustrating a sample inspection system 500 according to some embodiments of the inventive concepts.

Referring to FIG. 1, the sample inspection system 500 may include an image scanning device 200 and a computer 300. The image scanning device 200 may include a chamber 100, in which a sample 10 may be disposed, and an image scanning unit 110. The image scanning unit 110 is connected to the chamber 100 and is configured to obtain images from patterns in the sample 10. A stage 102 on which the sample 10 may be loaded may be provided in the chamber 100. The image scanning device 200 may be configured to perform a non-destructive test. As an example, the image scanning unit 110 may be a scanning electron microscope (SEM), and the chamber 100 may be a vacuum chamber.

The computer 300 may control the image scanning device 200 to obtain image data from the sample 10 and may process the image data obtained by the image scanning device 200. For example, the computer 300 may include a controller 120 configured to control the image scanning device 200, a data processing unit 130 configured to process information of various data types, and a library 140 configured to store the information of various data types. The library 140 may include, for example, a hard disk drive and/or a nonvolatile semiconductor memory device, for example, FLASH memory devices, phase-change memory devices, and/or magnetic memory devices, and so forth. The data processing unit 130 may communicate with the image scanning unit 110, the controller 120 and the library 140. The controller 120 may communicate with the data processing unit and the image scanning unit 110. Functions of each of the controller 120, the data processing unit 130, and the library 140 will be described in more detail below. Although not shown, the computer 300 may further include an input/output unit and an interface unit. The input/output unit may include a keyboard, a keypad, and/or a display device, or the like. The image data obtained by the image scanning device 200 may be transferred to the computer 300 through the interface unit. In addition, data processed by the computer 300 may be transferred to the image scanning device 200 through the interface unit. The interface unit may include, for example, a wired element, a wireless element, a universal serial bus (USB) port, or the like. The controller 120, the data processing unit 130, the library 140, the input/output unit, and the interface unit may be coupled to each other via at least one data bus.

The sample inspection system 500 may be used to perform an inspection process on a sample, for example, sample 10. Hereinafter, a sample inspection method according to some embodiments of the inventive concepts will be described with reference to FIGS. 2 to 9.

Figure 2:
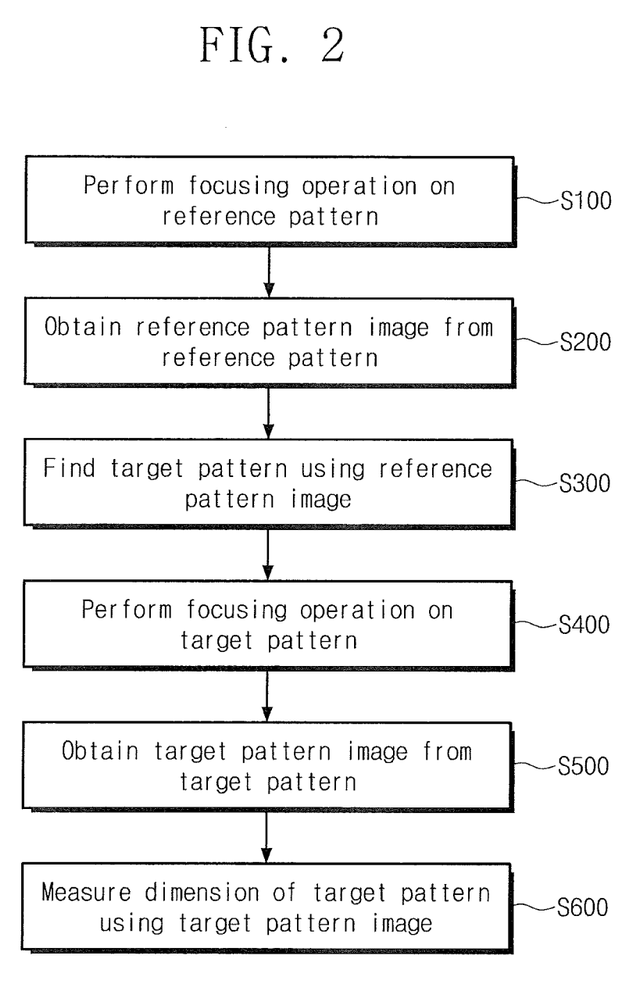
FIG. 2 is a flow chart illustrating a sample inspection method according to some embodiments of the inventive concepts.
Figure 3:
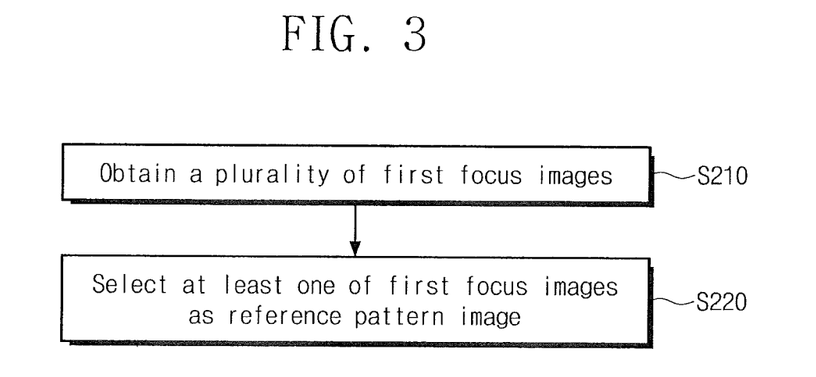
FIG. 3 is a flow chart illustrating operations of step S200 of FIG. 2.
Figure 4:
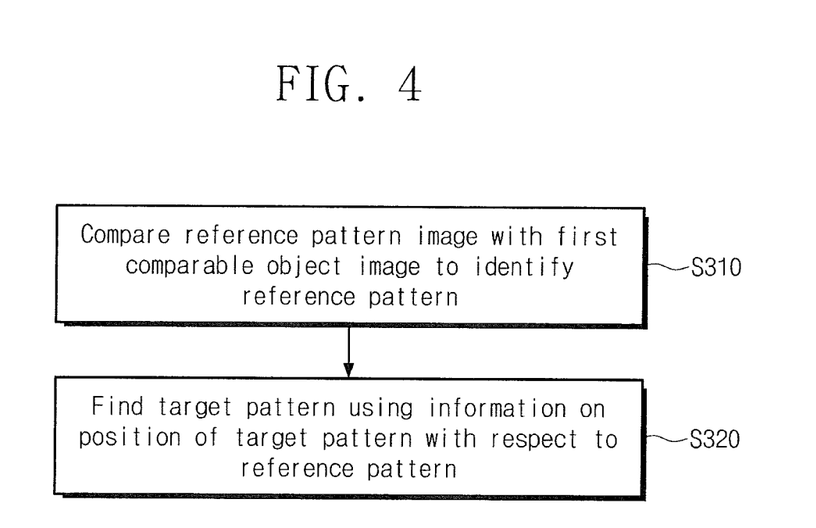
FIG. 4 is a flow chart illustrating operations of step S300 of FIG. 2.
Figure 5:
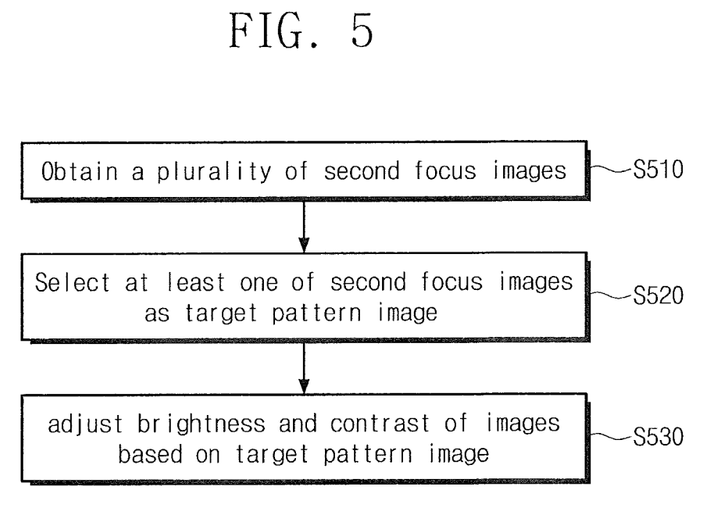
FIG. 5 is a flow chart illustrating operations of step S500 of FIG. 2.
Figure 6:
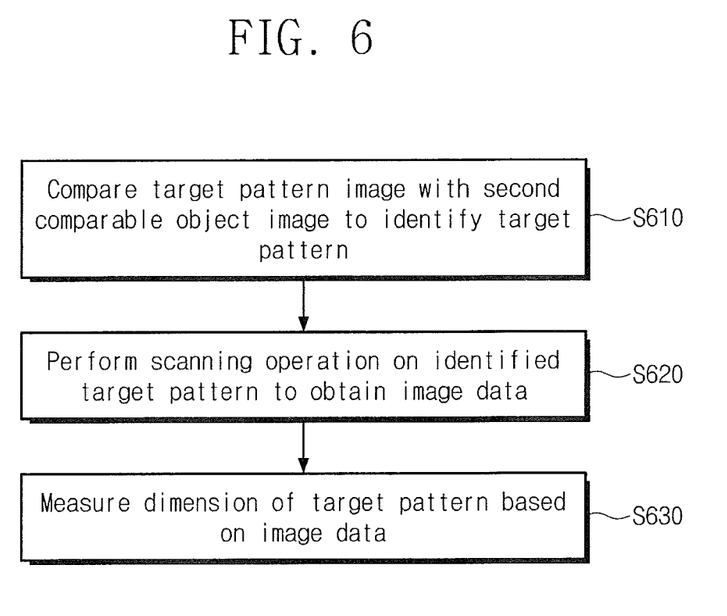
FIG. 6 is a flow chart illustrating operations of step S600 of FIG. 2.
Figure 7:
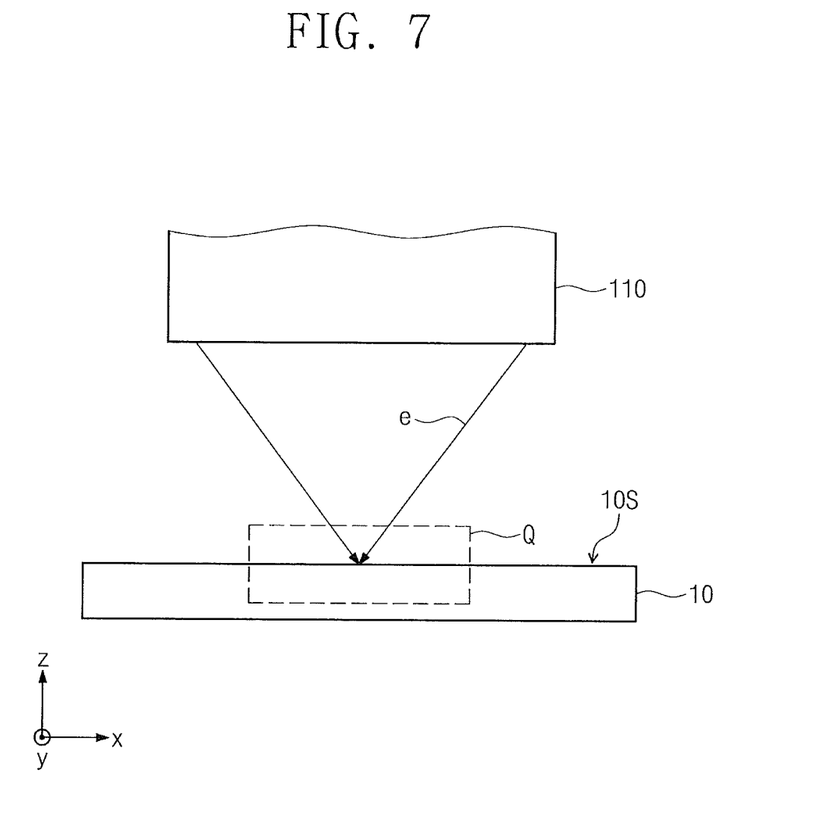
FIG. 7 is a schematic diagram illustrating a focusing-level adjustable scanning operation to be executed by an image scanning unit of FIG. 1.
Figure 8:
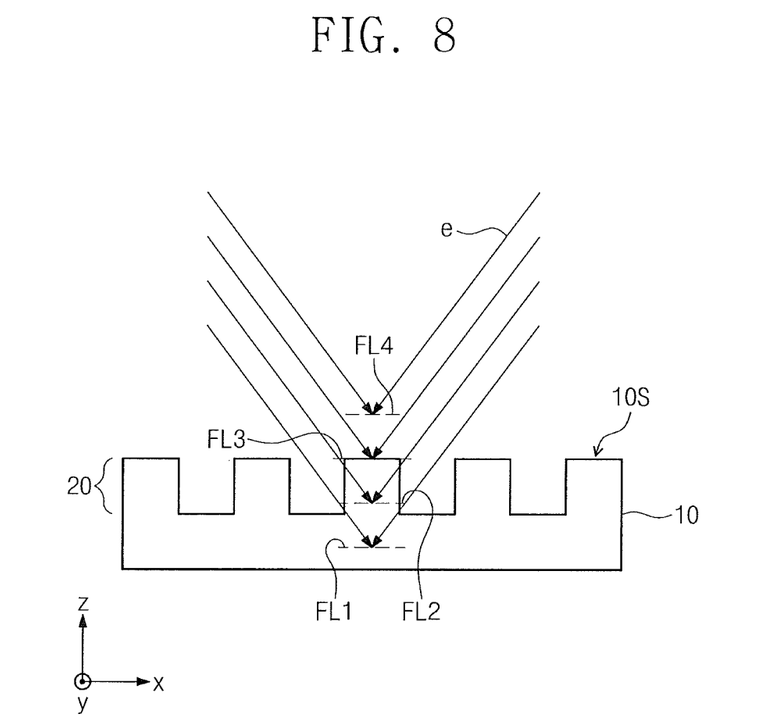
FIG. 8 is an enlarged view of a portion 'Q' shown in FIG. 7.
Figure 9:
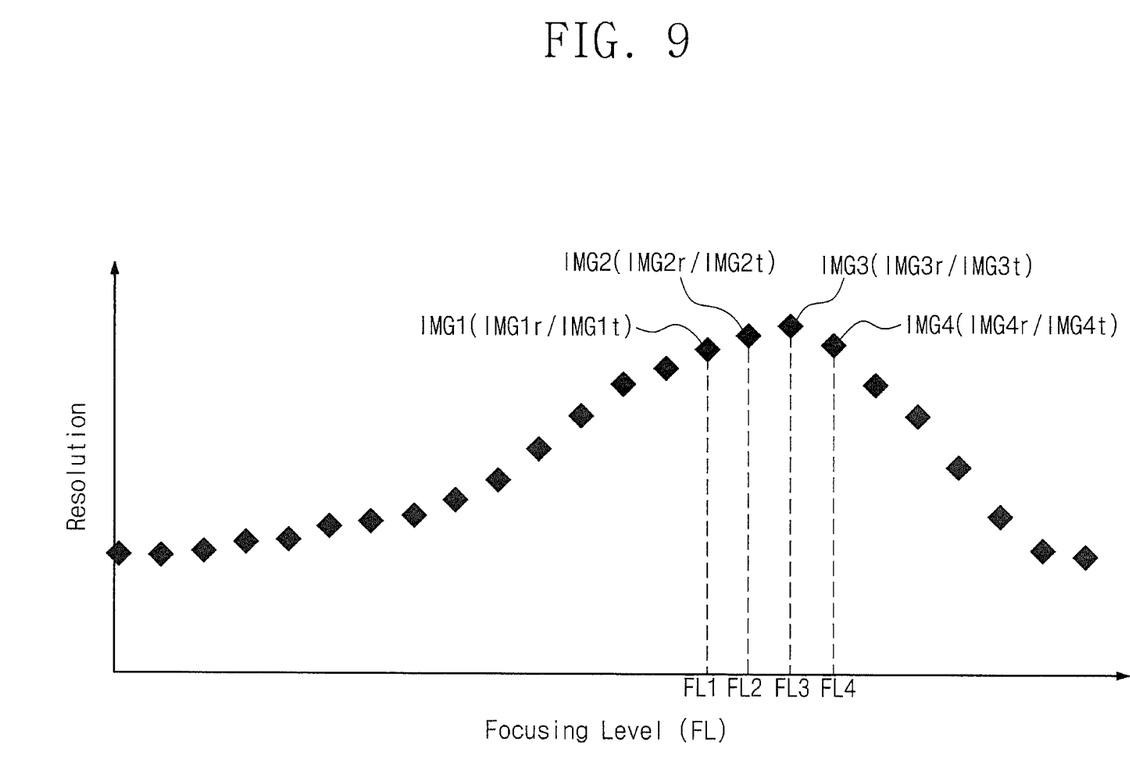
FIG. 9 is a graph illustrating image characteristics of focus images obtained by the image scanning unit of FIG. 1.

FIG. 2 is a flow chart illustrating a sample inspection method according to some embodiments of the inventive concepts. FIG. 3 is a flow chart illustrating operations of step S200 of FIG. 2, and FIG. 4 is a flow chart illustrating operations of step S300 of FIG. 2. FIG. 5 is a flow chart illustrating operations of step S500 of FIG. 2, and FIG. 6 is a flow chart illustrating operations of step S600 of FIG. 2. FIG. 7 is a schematic diagram illustrating a focusing-level adjustable scanning operation to be executed by the image scanning unit 110 of FIG. 1, and FIG. 8 is an enlarged view of a portion 'Q' of FIG. 7. FIG. 9 is a graph illustrating image characteristics of focus images obtained by the image scanning unit 110 of FIG. 1.

Referring to FIGS. 1 and 2, the sample 10 may be loaded on the stage 102 in the chamber 100 of the image scanning device 200. The sample 10 may be, for example, a wafer on which fine patterns are provided. The fine patterns may include a target pattern of which a dimension is to be measured, and a reference pattern which is spaced apart from the target pattern to provide information on a position of the target pattern. As an example, the reference pattern may have a peculiar shape that is distinguishable from other patterns adjacent thereto, and the target pattern may be one of regularly-arranged fine patterns.

The image scanning unit 110 may be positioned on the sample 10 to perform a focusing operation on the reference pattern of the sample 10 (in S100).

Firstly, the focusing operation of the image scanning unit 110 will be described with reference to FIGS. 7 to 9. The focusing operation may include scanning a surface 10S of the sample 10 having the fine patterns 20 thereon. A focusing level of the image scanning unit 110 may be adjusted during the scanning of the surface 10S of the sample 10, as shown in FIGS. 7 and 8. The fine patterns 20 may include the reference pattern and/or the target pattern. A focal point of the image scanning unit 110 may be formed on the surface 10S of the sample 10. In this embodiment, the surface 10S of the sample 10 may be defined to be positioned at a focusing level, for example, a third focusing level FL3, with respect to the image scanning unit 110. The adjusting of the focusing level of the image scanning unit 110 may include changing the focusing level of the image scanning unit 110 from the focusing level of FL3 to other focusing levels, for example, first focusing level FL1, second focusing level FL2, or fourth focusing level FL4, in a direction, for example, a z direction, perpendicular to the surface 10S of the sample 10. The fourth focusing level FL4 may be above and spaced apart from the third focusing level FL3 in the z direction. The second focusing level FL2 may be below and spaced apart from the third focusing level FL3 in the z direction. The first focusing level FL1 may be below and spaced apart from the second focusing level FL2 in the z direction. The scanning operation may be performed at each focusing level, that is, first to fourth focusing levels FL1, FL2, FL3, or FL4) and on a plane, for example, an x-y plane, that is substantially parallel to the surface 10S of the sample 10. The x-y plane may be substantially parallel to the surface 10A of the sample 10 and the z direction may be substantially perpendicular to the x-y plane. The focusing operation may be performed to obtain a focus image at each of a plurality of focusing levels, that is, the first to fourth focusing levels FL1, FL2, FL3 and FL4. The present inventive concepts are described having first to fourth focusing levels FL1, FL2, FL3 and FL4; however, the present inventive concepts are not limited thereto. For example, the present inventive concepts may include more than or less than four focusing levels.

In some embodiments, the image scanning unit 110 may be a scanning electron microscope. For example, the image scanning unit 110 may be configured to scan the surface 10S of the sample 10 with an electron beam e. In such an embodiment, a focal point of the electron beam e may be formed on the surface 10S of the sample 10, and, in this embodiment, the surface 10S of the sample 10 may be defined to be placed at a focusing level, for example the third focusing level FL3, with respect to the image scanning unit 110. The scanning operation of the image scanning unit 110 may be performed on the surface 10S of the sample 10 on the x-y plane. The focusing level of the image scanning unit 110 may be changed under control of the controller 120 of FIG. 1. The changing of the focusing level of the image scanning unit 110 may be performed in a direction, that is, the z direction, perpendicular to the surface 10S of the sample 10 or to the x-y plane. In the embodiment in which the image scanning unit 110 is a scanning electron microscope, an electric field generated in the image scanning unit 110 may be controlled to change a propagating direction of the electron beam e and, thereby, to change the focusing level of the image scanning unit 110. At each of the changed focusing levels, for example, the first focusing level FL1, the second focusing level FL2, and/or the fourth focusing level FL4, the image scanning unit 110 may perform the scanning operation on the surface 10S of the sample 10 in the direction parallel to the x-y plane.

That is, the focusing operation on the fine patterns 20 of the sample 10 may include performing the scanning operation in a direction parallel to the x-y plane, at each of the first to fourth focusing levels FL1, FL2, FL3, and/or FL4, which are spaced apart from each other in the z direction. Thus, a plurality of focus images IMG1, IMG2, IMG3, and IMG4 may be obtained at the first to fourth focusing levels FL1, FL2, FL3, and FL4, respectively, as shown in FIG. 9. The x-axis of the graph of FIG. 9 represents a focusing level FL and the y-axis of the graph of FIG. 9 represents resolution. The plurality of focus images IMG1, IMG2, IMG3, and IMG4 may have different resolutions. The highest resolution image of the focus images IMG1, IMG2, IMG3, and IMG4 may be selected as a best focus image, for example, focus image IMG3, and a focusing level, for example, third focusing level FL3, of the best focus image may be defined as a best focus.

Referring back to FIGS. 1 and 2, the focusing operation on the reference pattern 20 may include scanning a surface 10S of the sample 10 having the reference pattern, and during such a scanning operation, the focusing level of the image scanning unit 110 may be adjusted between multiple focusing levels, as described with reference to FIGS. 7 to 9. Accordingly, a plurality of first focus images IMG1*r*, IMG2*r*, IMG3*r*, and IMG4*r* of the reference pattern may be obtained at each of the focusing levels. The highest resolution image of the first focus images IMG1*r*, IMG2*r*, IMG3*r*, and IMG4*r* may be selected as a first best focus image, for example, focus image IMG3*r*, and a focusing level, for example, the third focusing level FL3, of the first best focus image, for example, focus image IMG3*r*, may be defined as a best focus.

Referring to FIGS. 1, 2, and 3, after the focusing operation on the reference pattern, a reference pattern image may be obtained from the reference pattern (in S200). The obtaining of the reference pattern image may include operating the data processing unit 130 of FIG. 1 to obtain the first focus images IMG1*r*, IMG2*r*, IMG3*r*, and IMG4*r* from the image scanning unit 110 (in S210) and selecting at least one of the first focus images IMG1*r*, IMG2*r*, IMG3*r*, and IMG4*r* as the reference pattern image of the reference pattern (in S220). In some embodiments, the first best focus image, for example, focus image IMG3*r*, or a composite image of the first best focus image, for example, focus image IMG3*r*, and other first focus images, for example, IMG1*r*, IMG2*r*, and IMG4*r*, may be selected as the reference pattern image. That is, the data processing unit 130 may be configured to store the first best focus image IMG3*r* or the composite image as the reference pattern image. As a result, the reference pattern image may be obtained from the first focus images IMG1*r*, IMG2*r*, IMG3*r*, and IMG4*r*, which are obtained during the focusing operation on the reference pattern, without additional scanning operations on the reference pattern.

Referring to FIGS. 1, 2 and 4, the reference pattern image may be used in an addressing operation for finding the target pattern (in S300). For example, the data processing unit 130 of FIG. 1 may be operated to, or configured to, compare the reference pattern image with a first comparable object image and to identify the reference pattern (in S310). The first comparable object image may be stored in the library 140 of FIG. 1 and may be used as a reference image for identifying the reference pattern. The data processing unit 130 may be configured to extract the first comparable object image from the library 140 and to identify the reference pattern based on whether the reference pattern image coincides with the first comparable object image. Thereafter, the target pattern may be located, based on a position or address information of the target pattern with respect to the reference pattern (in S320). The position information of the target pattern may be information stored in the library 140. If the reference pattern is identified, the data processing unit 130 may extract the position information of the target pattern from the library 140. The data processing unit 130 may provide the position information of the target pattern to the controller 120. Based on the position information of the target pattern provided from the data processing unit 130, the controller 120 may control the image scanning unit 110 to move an imaging area of the image scanning unit 110 from the reference pattern to the target pattern.

Referring back to FIGS. 1 and 2, after an imaging area of the image scanning unit 110 is moved to the target pattern in response to the controller 120, the image scanning unit 110 may perform a focusing operation on the target pattern of the sample 10 (in S400). The focusing operation on the target pattern may include scanning the surface of the sample 10 with the target pattern at different focusing levels, for example, the first to fourth focusing levels FL1 to FL4 which are spaced apart from each other in the z direction, as described with reference to FIGS. 7 to 9. Accordingly, a plurality of second focus images IMG1*t*, IMG2*t*, IMG3*t*, and IMG4*t* of the target pattern may be obtained. The highest resolution image of the second focus images IMG1*t*, IMG2*t*, IMG3*t*, and IMG4*t* may be selected as a second best focus image, for example, focus image IMG3*t*, and a focusing level, for example, the third focusing level FL3, of the second best focus image, for example, focus image IMG3*t*, may be defined as a best focus.

Referring to FIGS. 1, 2, and 5, after the focusing operation on the target pattern, a target pattern image may be obtained from the target pattern (in S500). Obtaining the target pattern image may include operating the data processing unit 130 of FIG. 1 to obtain the second focus images IMG1*t*, IMG2*t*, IMG3*t*, and IMG4*t* with the image scanning unit 110 (in S510) and selecting at least one of the second focus images IMG1*t*, IMG2*t*, IMG3*t*, and IMG4*t* as the target pattern image of the target pattern (in S520). In some embodiments, the second best focus image, for example, focus image IMG3*t*, of the second focus images IMG1*t*, IMG2*t*, IMG3*t*, and IMG4*t*, or a composite image of the second best focus image, for example, IMG3*t*, and other second focus images, for example, focus images IMG1*t*, IMG2*t*, and IMG4*t*, may be selected as the target pattern image. That is, the data processing unit 130 may be configured to store the second best focus image IMG3*t* or the composite image as the target pattern image. As a result, the target pattern image may be obtained from the second focus images IMG1*t*, IMG2*t*, IMG3*t*, and IMG4*t*, which are obtained during the focusing operation on the target pattern, without additional scanning operations on the target pattern.

Obtaining the target pattern image may further include adjusting image properties, for example, brightness and contrast, of images, based on the target pattern image (in S530). The data processing unit 130 may provide the target pattern images to the controller 120. The controller 120 may control the image scanning unit 110 to adjust brightness and contrast of images, which are obtained from the sample 10, based on the target pattern image provided from the data processing unit 130. The image scanning unit 110 may be, for example, a scanning electron microscope, and, in such an embodiment, to adjust brightness and contrast of the images obtained from the sample 10, the controller 120 may control the image scanning unit 110 to adjust an incident angle of an electron beam e, which propagates from the image scanning unit 110 toward the surface 10S of the sample 10, and/or an acceleration voltage applied to the image scanning unit 110.

Referring to FIGS. 1, 2, and 6, the target pattern image may be used to measure a dimension of the target pattern (in S600). Firstly, the target pattern image may be compared with a second comparable object image to identify the target pattern (in S610). The second comparable object image may be stored in the library 140 of FIG. 1 and may be used as a reference image for identifying the target pattern. The data processing unit 130 may be configured to extract the second comparable object image from the library 140, to examine whether the target pattern image coincides with the second comparable object image, and to identify the target pattern based on the result of the examination. Next, the image scanning unit 110 may perform a scanning operation on the identified target pattern to obtain image data (in S620). That is, the data processing unit 130 may provide the identification information of the target pattern to the controller 120, and the image scanning unit 110 may perform the scanning operation on the identified target pattern, under the control of the controller 120. Thereafter, the data processing unit 130 may measure a dimension of the target pattern based on the image data obtained from the image scanning unit 110 (in S630). In some embodiments, the image scanning unit 110 may be, for example, a scanning electron microscope, which is configured to emit an electron beam e onto the surface 10S of the sample 10, as shown in FIG. 7. In such an embodiment, the image data obtained from the image scanning unit 110 may contain information on secondary electrons, which are emitted from the surface 10S of the sample 10. In the data processing unit 130, the information on the secondary electrons may be used to measure a dimension, for example, line width, of the target pattern formed on the surface 10S of the sample 10. The dimension of the target pattern, which is measured based on the image data, may be stored in the library 140 and may be displayed on an input/output unit of the computer 300.

Figure 10:
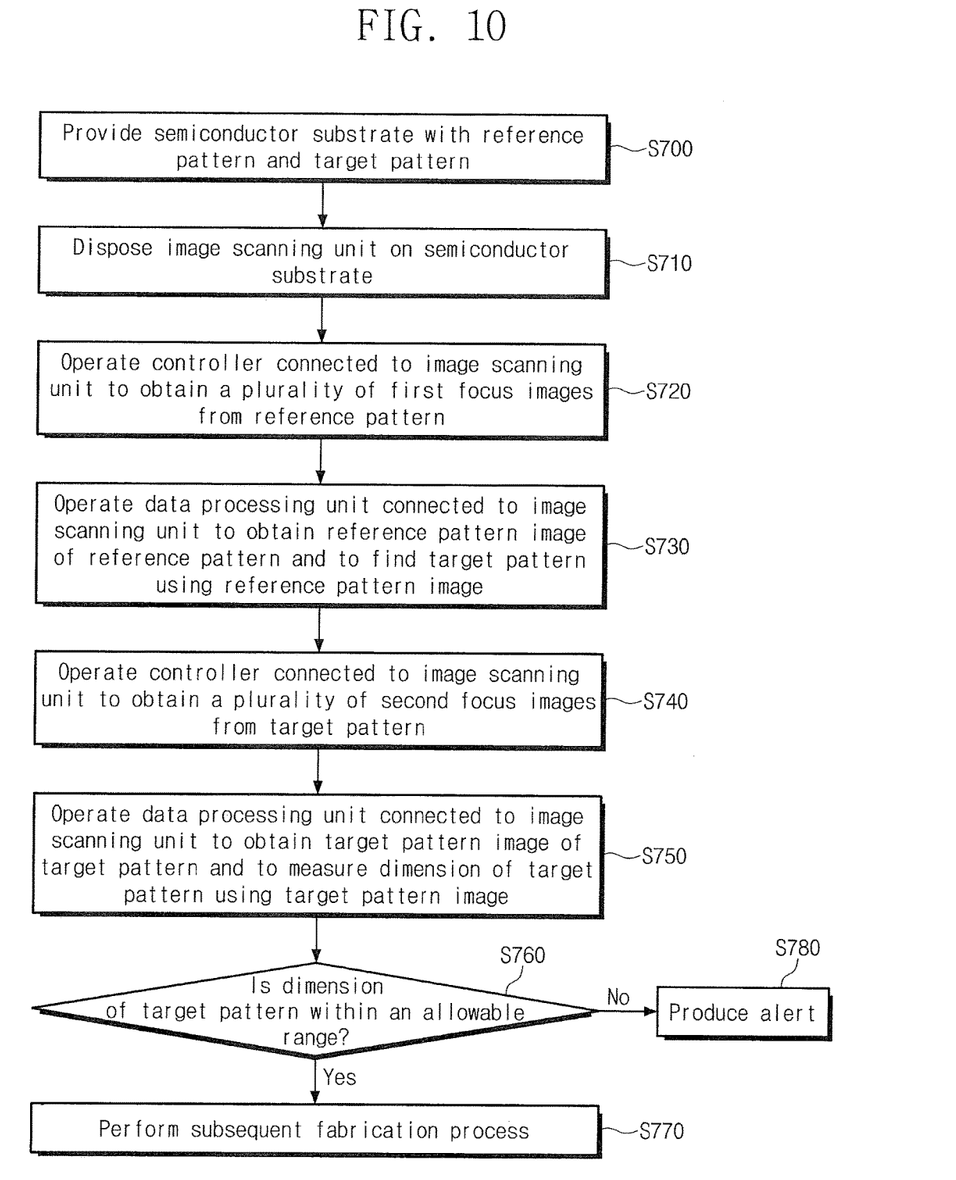
FIG. 10 is a flow chart illustrating a method of inspecting a semiconductor device using a sample inspection method according to some embodiments of the inventive concepts.

FIG. 10 is a flow chart illustrating a method of inspecting a semiconductor device using a sample inspection method according to some embodiments of the inventive concepts.

Referring to FIGS. 1 and 10, a sample 10, for example, a semiconductor substrate, with a reference pattern and a target pattern may be provided (in S700). As an example, the reference pattern may have a peculiar shape that is distinguishable from other patterns adjacent thereto, and the target pattern may be one of fine patterns that are repeatedly formed on the semiconductor substrate 10. The reference pattern may be provided to be spaced apart from the target pattern and may be used as a positional reference for finding the target pattern, and the inspection may be performed to measure a dimension of the target pattern. The semiconductor substrate 10 may be loaded on the stage 102, which is provided in the chamber 100 of the image scanning device 200, and the image scanning unit 110 of the image scanning device 200 may be disposed on the semiconductor substrate 10 (in S710).

The controller 120 connected to the image scanning unit 110 may be operated to obtain a plurality of first focus images IMG1r, IMG2r, IMG3r, and IMG4r from the reference pattern (in S720). The first focus images IMG1r, IMG2r, IMG3r, and IMG4r may be obtained by performing a focusing operation on the reference pattern using the image scanning unit 110. That is, the controller 120 may be configured to control the image scanning unit 110 to obtain the first focus images IMG1r, IMG2r, IMG3r, and IMG4r. The focusing operation on the reference pattern may include scanning a surface of the semiconductor substrate 10 with the reference pattern at different focusing levels, for example, first to fourth focusing levels FL1 to FL4 which are spaced apart from each other in the z direction, as described with reference to FIGS. 7 to 9.

The data processing unit 130 connected to the image scanning unit 110 may be operated to obtain a reference pattern image of the reference pattern, and the reference pattern image may be used to find the target pattern (in S730).

The obtaining of the reference pattern image may include obtaining the first focus images IMG1r, IMG2r, IMG3r, and IMG4r from the image scanning unit 110 and selecting at least one of the plurality of first focus images IMG1r, IMG2r, IMG3r, and IMG4r as the reference pattern image, as described with reference to FIG. 3. That is, the data processing unit 130 may store a first best focus image, that is, focus image IMG3r having the highest resolution, selected from the first focus images IMG1r, IMG2r, IMG3r, and IMG4r, or a composite image of the first best focus image IMG3r and other first focus images IMG1r, IMG2r, and IMG4r, as the reference pattern image.

The finding of the target pattern may include operating the data processing unit 130 to compare the reference pattern image with a first comparable object image and to identify the reference pattern and then finding the target pattern based on information on a position or address of the target pattern with respect to the reference pattern, as described with reference to FIG. 4. The data processing unit 130 may extract the position information of the target pattern relative to the reference pattern from the library 140, and the controller 120 may control the image scanning unit 110, based on the position information of the target pattern provided from the data processing unit 130, such that an imaging area of the image scanning unit 110 is moved from the reference pattern to the target pattern.

The controller 120 connected to the image scanning unit 110 may be operated to obtain a plurality of second focus images IMG1t, IMG2t, IMG3t, and IMG4t from the target pattern (in S740). The second focus images IMG1t, IMG2t, IMG3t, and IMG4t may be obtained by performing a focusing operation on the target pattern using the image scanning unit 110. That is, the controller 120 may control the image scanning unit 110 to perform the focusing operation on the target pattern. The focusing operation on the target pattern may include scanning the surface 10S of the semiconductor substrate 10 with the target pattern at different focusing levels, for example, first to fourth focusing levels FL1 to FL4 which are spaced apart from each other in the z direction, as described with reference to FIGS. 7 to 9.

The data processing unit 130 connected to the image scanning unit 110 may be operated to obtain a target pattern image of the target pattern from the image scanning unit 110 and to measure a dimension of the target pattern based on the target pattern image (in S750).

The obtaining of the target pattern image may include obtaining the plurality of second focus images IMG1t, IMG2t, IMG3t, and IMG4t from the image scanning unit 110 and then selecting at least one of the plurality of second focus images IMG1t, IMG2t, IMG3t, and IMG4t as the target pattern image, as described with reference to FIG. 5. That is, the data processing unit 130 may store a second best focus image, that is, focus image IMG3t having the highest resolution, selected from the second focus images IMG1t, IMG2t, IMG3t, and IMG4t, or a composite image of the second best focus image IMG3t and other second focus images IMG1t, IMG2t, and IMG4t, as the target pattern image. The obtaining of the target pattern image may further include adjusting image properties, for example, brightness and contrast, of images, based on the target pattern image. That is, the controller 120 may control the image scanning unit 110 to adjust brightness and contrast of images, which are obtained from the semiconductor substrate 10, based on the target pattern image provided from the data processing unit 130 to the controller 120, as described in connection with FIG. 5.

As described with reference to FIG. 6, the measuring of the dimension of the target pattern may include comparing the target pattern image with a second comparable object image to identify the target pattern, performing a scanning operation on the identified target pattern to obtain image data, and then, measuring the dimension of the target pattern, based on the image data. The data processing unit 130 may be configured to extract the second comparable object image from the library 140, to examine whether the target pattern image coincides with the second comparable object image, and to identify the target pattern based on the result of the examination. The data processing unit 130 may provide the identification information of the target pattern to the controller 120, and the controller 120 may control the image scanning unit 110 to perform the scanning operation on the identified target pattern. As a result, the image data on the target pattern may be obtained by the image scanning unit 110. Thereafter, the data processing unit 130 may measure the dimension of the target pattern based on the image data obtained from the image scanning unit 110.

After the measurement of the dimension of the target pattern, the semiconductor substrate 10 may be unloaded from the stage 102 and the chamber 100. Thereafter, a step may be performed to examine whether the dimension of the target pattern is in an allowable range (in S760). If the dimension of the target pattern is within the allowable range, a subsequent fabrication process for forming a semiconductor device on the semiconductor substrate 10 may be performed (in S770). If the dimension of the target pattern is not within the allowable range, an alert may be produced (in S780).

According to some embodiments of the inventive concepts, the image scanning unit 110 may be configured to obtain a plurality of focus images, for example, first focus images, IMG1r, IMG2r, IMG3r, and IMG4r, during a focusing operation on the reference pattern formed on the sample 10 and to select and use at least one of the first focus images IMG1r, IMG2r, IMG3r, and IMG4r as the reference pattern image. In addition, the image scanning unit 110 may be configured to obtain a plurality of focus images, for example, second focus images, IMG1t, IMG2t, IMG3t, and IMG4t, during a focusing operation on the target pattern formed on the sample 10 and to select and use at least one of the second focus images IMG1t, IMG2t, IMG3t, and IMG4t as the target pattern image. That is, the reference pattern image or the target pattern image may be easily obtained from the plurality of focus images, for example, first focus images IMG1r, IMG2r, IMG3r, and IMG4r and second focus images IMG1t, IMG2t, IMG3t, and IMG4t, respectively, which are obtained during the focusing operation on the reference pattern or the target pattern, without additional scanning operations on the reference pattern or the target pattern. Accordingly, it is possible to reduce a process time taken to inspect the sample 10 with the reference pattern and/or the target pattern.

Furthermore, when the method or system according to some embodiments of the inventive concepts is used to inspect a semiconductor device, a process time taken to inspect the semiconductor device may be reduced. As a result, fabrication cost of the semiconductor device may be reduced.

According to some embodiments of the inventive concepts, an image scanning unit may be configured to obtain a plurality of focus images during a focusing operation on a pattern formed on a sample and to select and use at least one of the focus images as a pattern image. As a result, the pattern image may be easily obtained from the focus images, which are obtained during the focusing operation on the pattern, without additional scanning operations on the pattern. Accordingly, a process time taken to inspect the sample with the pattern may be reduced.

Furthermore, when the method or system according to some embodiments of the inventive concepts is used to inspect a semiconductor device, a process time taken to inspect the semiconductor device may be reduced and, as a result, fabrication cost of the semiconductor device may be reduced.

Although a few embodiments of the present general inventive concepts have been shown and described, it will be appreciated by those skilled in the art that variations may be made in the embodiments without departing from the principles and spirit of the general inventive concepts, the scope of which is defined in the appended claims and their equivalents.

What is claimed is:

1. A method of inspecting a sample, comprising:
    performing a focusing operation on a target pattern of a sample, wherein the focusing operation comprises scanning the target pattern at different focusing levels to obtain a plurality of focus images;
    using at least one of the plurality of the focus images as a target pattern image of the target pattern; and
    measuring a dimension of the target pattern based on the target pattern image,
    wherein scanning the target pattern comprises scanning a surface of a sample with an electron beam using a scanning electron microscope;
    wherein the target pattern image includes information on secondary electrons emitted from a surface of a sample and the information of the secondary electrons is used in the measuring of a dimension of the target pattern.

2. The method of claim 1, wherein the using of the at least one of the plurality of focus images as the target pattern image comprises selecting a highest resolution image of the plurality of focus images as a best focus image and using the best focus image as the target pattern image.

3. The method of claim 1, wherein the using of the at least one of the plurality of the focus images as the target pattern image comprises selecting a highest resolution image of the plurality of the focus images as a best focus image and using a composite image of the best focus image and others of the plurality of the focus images as the target pattern image.

4. The method of claim 1, further comprising adjusting brightness and contrast of images of the sample based on the target pattern image.

5. The method of claim 1, wherein the measuring of the dimension of the target pattern comprises:
    identifying the target pattern based on whether the target pattern image coincides with a comparable object image of the target pattern;

performing a scanning operation on the identified target pattern to obtain image data; and measuring the dimension of the target pattern, based on the image data.

6. The method of claim 1, wherein the plurality of the focus images are first focus images, and the method further comprises:

performing a focusing operation on a reference pattern of the sample, before performing the focusing operation on the target pattern of the sample, wherein the focusing operation on the reference pattern comprises scanning the reference pattern at different focusing levels to obtain a plurality of second focus images;

using at least one of the plurality of the second focus images as a reference pattern image of the reference pattern; and locating the target pattern, which is spaced apart from the reference pattern, using the reference pattern image.

7. The method of claim 6, wherein the using of the at least one of the plurality of the second focus images as the reference pattern image comprises selecting a highest resolution image of the plurality of the second focus images as a best focus image and using the best focus image as the reference pattern image.

8. The method of claim 6, wherein the using of the at least one of the plurality of the second focus images as the reference pattern image comprises selecting a highest resolution image of the plurality of the second focus images as a best focus image and using a composite image of the best focus image and others of the plurality of the second focus images as the reference pattern image.

9. The method of claim 6, wherein the locating the target pattern comprises:

identifying the reference pattern based on whether the reference pattern image coincides with a comparable object image of the reference pattern; and locating the target pattern based on information on a position of the target pattern with respect to the reference pattern.

10. A system for inspecting a sample, comprising:

an image scanning unit configured to obtain an image of a pattern formed on a sample;

a controller configured to control the image scanning unit, wherein the controller is configured to control the image scanning unit to perform a scanning operation on the pattern at different focusing levels and to obtain a plurality of focus images; and a data processing unit configured to store at least one of the plurality of focus images as a pattern image of the pattern and to measure a dimension of the pattern based on the pattern image, wherein scanning operation comprises scanning a surface of a sample with an electron beam using a scanning electron microscope;

wherein the pattern image includes information on secondary electrons emitted from a surface of a sample and the information of the secondary electrons is used in the measuring of a dimension of the pattern.

11. The system of claim 10, wherein the data processing unit is configured to select a highest resolution image of the plurality of the focus images as a best focus image and to store the best focus image as the pattern image.

12. The system of claim 10, wherein the data processing unit is configured to select a highest resolution image of the plurality of the focus images as a best focus image and to store a composite image of the best focus image and others of the plurality of the focus images as the pattern image.

13. The system of claim 10, wherein the pattern comprises a reference pattern and a target pattern, the controller controls the image scanning unit to obtain a plurality of first focus images and a plurality of second focus images from the reference pattern and the target pattern, respectively, and the data processing unit is configured to store at least one of the plurality of the first focus images as a reference pattern image of the reference pattern, to store at least one of the plurality of the second focus images as a target pattern image of the target pattern, and to measure the dimension of the target pattern based on the reference pattern image and the target pattern image.

14. The system of claim 13, wherein the data processing unit is configured to provide the target pattern image to the controller, and the controller controls the image scanning unit to adjust brightness and contrast of images obtained from the sample, based on the target pattern image.

15. The system of claim 13, further comprising a library that is configured to store a first comparable object image of the reference pattern, a second comparable object image of the target pattern, and position information on a position of the target pattern with respect to the reference pattern, wherein the data processing unit is configured to extract the first comparable object image from the library and to identify the reference pattern based on whether the reference pattern image coincides with the first comparable object image.

16. A method of inspecting a sample, comprising:

performing a focusing operation on a pattern of a sample, wherein the focusing operation comprises scanning the pattern at different focusing levels spaced apart from each other in a first direction to obtain a plurality of focus images;

using at least one of the plurality of the focus images as a pattern image of the pattern; and measuring a dimension of the pattern based on the pattern image, wherein scanning the pattern comprises scanning a surface of a sample with an electron beam using a scanning electron microscope;

wherein the pattern image includes information on secondary electrons emitted from a surface of a sample and the information of the secondary electrons is used in the measuring of a dimension of the pattern.

17. The method of claim 16, wherein the pattern comprises a reference pattern and a target pattern, wherein obtaining the plurality of the focus images comprises obtaining a plurality of first focus images and a plurality of second focus images from the reference pattern and the target pattern, respectively, wherein using at least one of the plurality of focus images comprises using at least one of the plurality of the first focus images as a reference pattern image of the reference pattern and using at least one of the plurality of the second focus images as a target pattern image of the target pattern, and wherein, measuring the dimension of the pattern based on the pattern image comprises measuring the dimension of the target pattern based on the reference pattern image and the target pattern image.

18. The method of claim 17, wherein the using the at least one of the plurality of second focus images as the target pattern image comprises selecting a highest resolution image of the plurality of second focus images as a best focus image and using the best focus image as the target pattern image.

19. The method of claim 17, wherein the using of the at least one of the plurality of second focus images as the target pattern image comprises selecting a highest resolution image of the plurality of the second focus images as a best focus image and using a composite image of the best focus image and others of the plurality of the second focus images as the target pattern image.

20. The method of claim 17, further comprising adjusting brightness and contrast of images of the sample based on the target pattern image.

* * * * *